Figure 1:
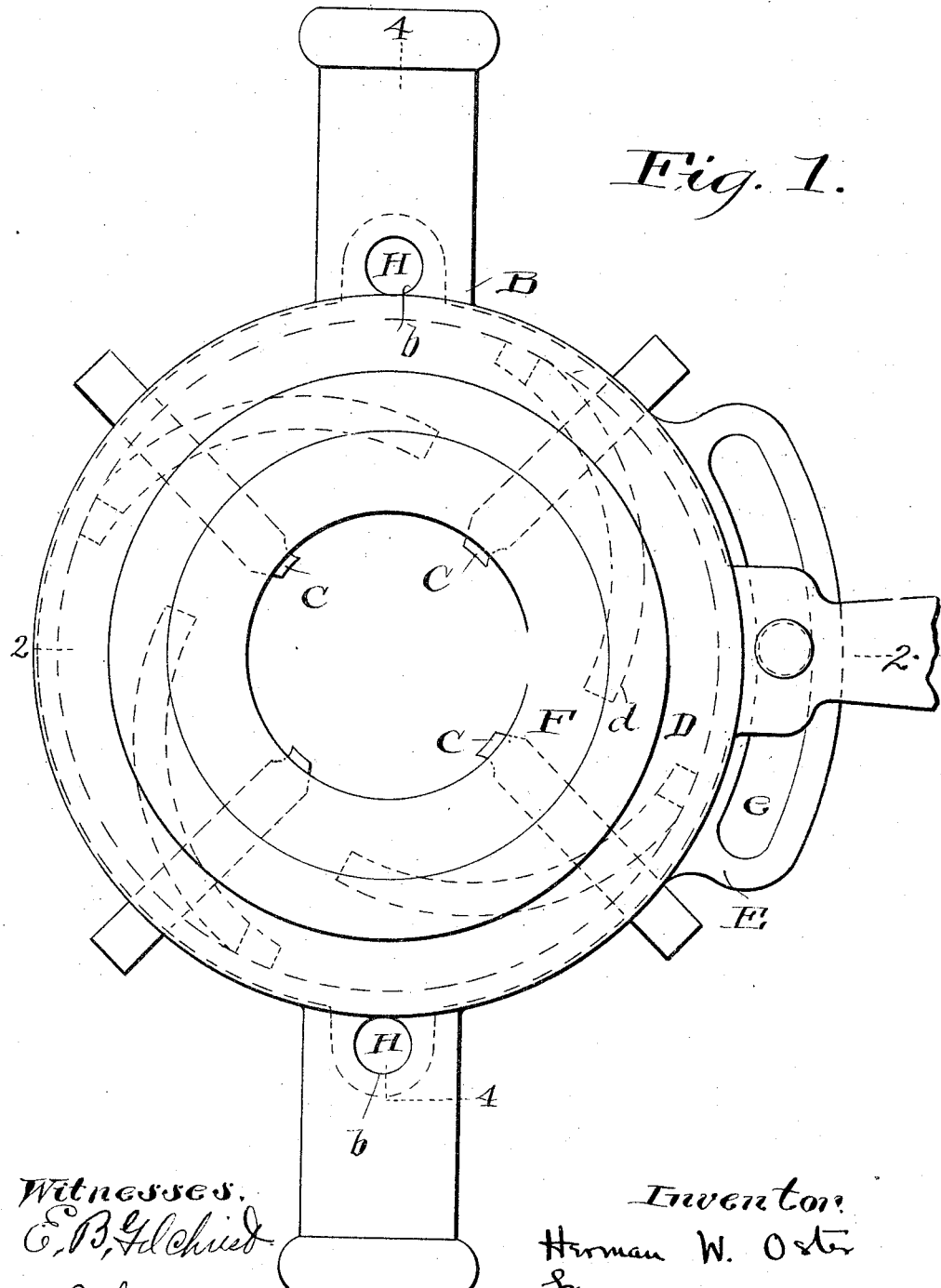

H. W. OSTER.
DIE STOCK.
APPLICATION FILED FEB. 26, 1908.

965,320.

Patented July 26, 1910.
3 SHEETS—SHEET 2.

Witnesses
E. B. Gilchrist
H. B. Sullivan

Inventor
Herman W. Oster
by
Thurston & Woodward
attys

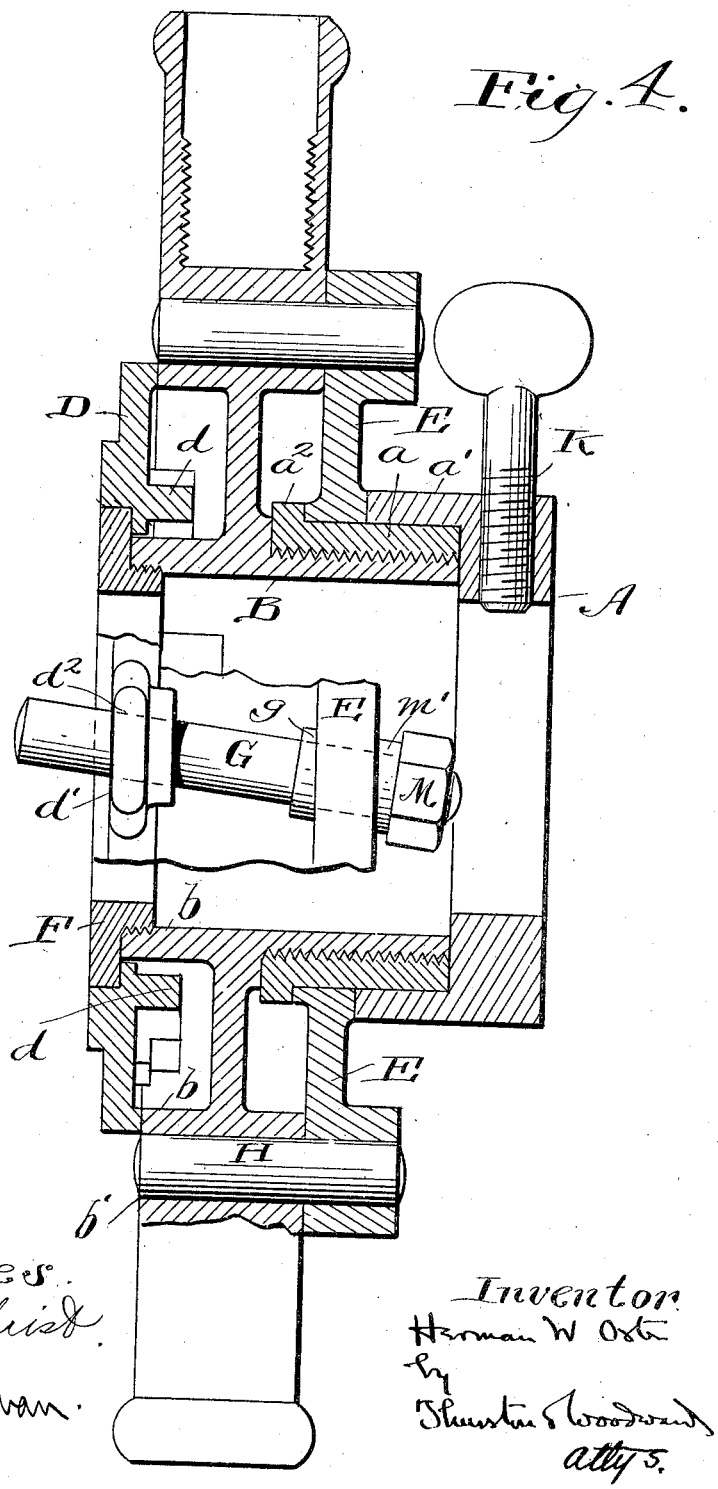

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-STOCK.

965,320.  Specification of Letters Patent.  Patented July 26, 1910.

Application filed February 26, 1908. Serial No. 417,806.

*To all whom it may concern:*

Be it known that I, HERMAN W. OSTER, a citizen of the United States, residing at Cleveland, in the county of Cuyahoga and State of Ohio, have invented a certain new and useful Improvement in Die-Stocks, of which the following is a full, clear, and exact description.

This invention is a die stock especially contrived for the purpose of cutting taper threads on a cylindrical piece, such for example as a pipe.

The object of the invention is to provide a simple and efficient device for this purpose, and one which may be very easily adjusted to work upon pipes of different diameters.

The invention consists in the combinations of parts shown in the drawings and hereinafter described and pointed out definitely in the claims.

Figure 2:
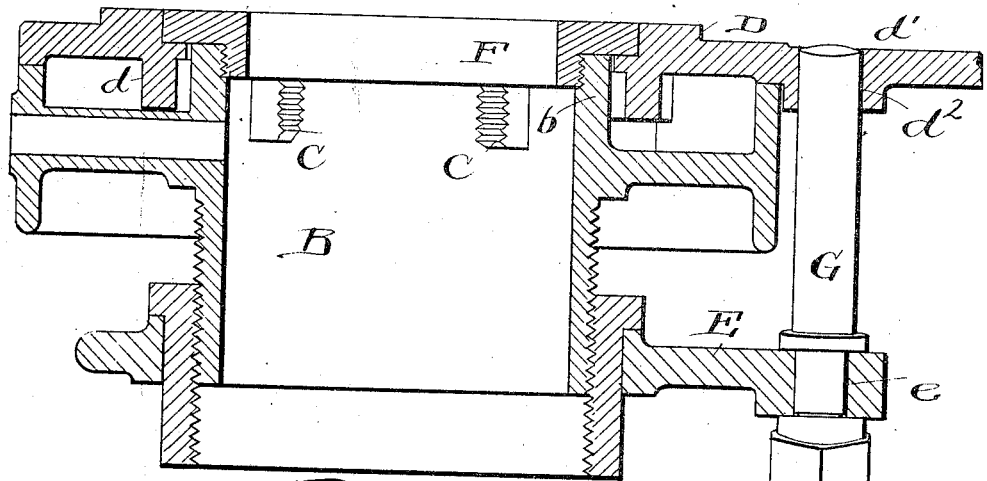
Figure 3:
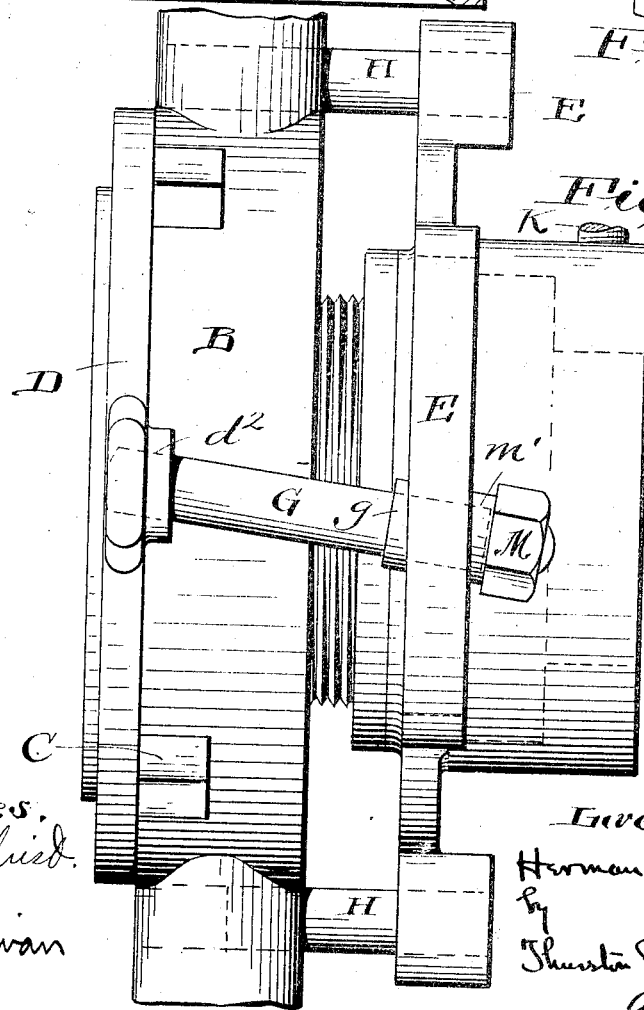

In the drawing, Figure 1 is an end view of a die stock embodying the invention. Fig. 2 is a central longitudinal section thereof in the plane of line 2—2 on Fig. 1. Fig. 3 is a side elevation thereof. Fig. 4 is a side elevation partly sectioned in the plane indicated by line 4—4 on Fig. 1.

Referring to parts by letters, A represents a tubular work holder which is preferably made of two parts, $a$, $a'$ rigidly fixed together. Suitable means, as for example radial set screws K, may provide for clamping this member onto the pipe which is to be threaded.

B represents the tubular die carrier which is externally threaded on its inner end, and is screwed into the work holder. The pitch of these threads is the same as the pitch of the threads on the dies C. These dies are movable in and out radially in guide-ways into outer end of the member B.

A cam plate D is rotatively mounted on the outer end of the member B. It bears against the end of a cylindrical flange $b$ fixed to the member B, and it may be held in place by a flanged ring F which is screwed into the end of the member B. This cam has on its inner face cam ribs $d$, which enter notches in the dies. There is nothing new about this cam plate or the parts directly associated with it, except as hereinafter described; that is to say, as to the cam plate itself, it is provided with a portion $d'$ which overhangs the member B and has a hole $d^2$ through it.

E represents a ring which is rotatively mounted on the work holder. It must be incapable of longitudinal movement thereon. It is preferably mounted in an annular groove which is formed between the overhanging flange $a^2$ on the part $a$ of the work holder, and the end of the part $a'$ thereof. Pins H secured to this ring and lying parallel to its axis pass into holes $b'$ in the member B. Therefore the member B and the ring E must rotate together; but the member B is nevertheless permitted to move longitudinally relative to said ring, as when said member B is screwed into or out of the work holder.

G represents an arm which is adjustably fixed to the ring E and extends therefrom in an approximately spiral direction toward the cam plate and through the hole $d^2$ therein. This arm as shown is a straight rod, set at an inclination which is approximately spiral; and the hole $d^2$ is sufficiently elongated in a radial direction to enable it to do the work for which it is provided. If this arm were formed and arranged in a true spiral, perhaps the device would work with greater exactness; but the construction shown is the cheaper construction and works in a thoroughly practical manner. This rod passes through an arcual slot $e$ in the ring E, in which slot said rod may be adjustably fixed. This permits the adjusting of the cam plate to the position it should have at the beginning of the threading operation,—that is to say, the turning of the cam plate to adjust the dies to the work. When the cam plate has been turned into the proper position, this rod G is clamped to the ring. On said rod is a flange $g$ which lies against one face of the ring. A nut M is screwed onto the protruding end of this rod and the wedged shape washer $m'$ lies between the nut and ring so that when the nut is turned up the rod will remain in the inclined position described and shown.

It is evident that as the member B and ring E are turned in the thread cutting operation the member B will be screwed into the work holder and will thereby move longitudinally relative to the work holder and to the ring E. The ring E turns with it and the cam plate turns with the ring,—except that, as the cam plate moves longitudinally with member B, it will slip along the inclined rod G and will thereby be turned slightly relative to the member B. The direction in which it is so turned is that which causes or permits the dies to recede outward, and the result is the cutting of a taper thread on the pipe. This turning of the cam plate and consequent recession of the dies depends upon the inclination of the arm G.

Having thus described my invention, I claim:

1. In a die stock, the combination of a tubular work holder, a tubular die carrier, the one screwed into the other, dies carried by the die carrier and movable therein toward and from its axis of rotation, a cam plate rotatably mounted upon the die carrier in engagement with the dies and having an extension which projects beyond said die carrier, a ring rotatably mounted upon the work holder but incapable of moving longitudinally thereon, an approximately spiral arm adjustably fixed to one of the two last specified members and projecting through a hole in the other, and means which compel said ring and die carrier to rotate in unison.

2. In a die stock, the combination of a tubular work holder, a tubular die carrier, the one screwed into the other, dies carried by the die carrier and movable therein toward and from its axis of rotation, a cam plate rotatably mounted upon the die carrier in engagement with the dies and having an extension which projects beyond said die carrier, said extension having a hole through it, a ring rotatably mounted upon the work holder but incapable of moving longitudinally thereon, an arm adjustably fixed to said ring and extending therefrom in an approximately spiral direction toward and into the hole in the cam plate, and means which compel said ring and die carrier to rotate in unison.

3. In a die stock, the combination of a tubular work holder, a tubular die carrier, the one screwed into the other, dies carried by the die carrier and movable therein toward and from its axis of rotation, a cam plate rotatably mounted upon the die carrier in engagement with the dies and having an extension which projects beyond said die carrier, said extension having a hole through it, a ring rotatably mounted upon the work holder but incapable of moving longitudinally thereon, an arm fixed to said ring and extending therefrom in an approximately spiral direction toward and into the hole in the cam plate, and means which compel said ring and die carrier to rotate in unison, said means comprising longitudinally extended pins secured to one of said parts and passing into holes in the other.

4. In a die stock, the combination of a tubular work holder, a tubular die carrier, the one screwed into the other, dies carried by the die carrier and movable therein toward and from its axis of rotation, a cam plate rotatably mounted upon the die carrier in engagement with the dies and having an extension which projects beyond said die carrier, said extension having a hole through it, a ring rotatably mounted upon the work holder, but incapable of moving longitudinally thereon, the said ring and cam plate having the one an arcual slot and the other a hole, an approximately spiral arm which extends through said slot and through said hole, and means for clamping said arm to the member containing said arcual slot when the arm is at any desired position in said slot.

5. In a die stock, the combination of a tubular work holder, a coaxial tubular die carrier capable of rotating and of moving longitudinally relative to the work holder, dies carried by the die carrier and movable therein toward and from its axis of rotation, a cam plate rotatably mounted upon the die carrier in engagement with the dies, a coaxial rotatable ring,—said cam plate and die carrier being provided the one with an approximately spiral arm and the other with a hole into which said arm projects, means preventing the longitudinal movement of said ring relative to the work holder, and means which compel the ring and die carrier to rotate in unison.

In testimony whereof, I hereunto affix my signature in the presence of two witnesses.

HERMAN W. OSTER.

Witnesses:
R. B. TEWKSBURY,
A. S. GOULD.